(12) United States Patent
Kim et al.

(10) Patent No.: US 11,768,563 B2
(45) Date of Patent: Sep. 26, 2023

(54) TOUCH DISPLAY DEVICE

(71) Applicant: LG Display Co., Ltd., Seoul (KR)

(72) Inventors: SunYeop Kim, Seoul (KR); SungChul Kim, Paju-si (KR); HoonBae Kim, Seoul (KR); Junghan Lee, Seoul (KR); Seongkyu Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/972,461

(22) Filed: Oct. 24, 2022

(65) Prior Publication Data
US 2023/0214060 A1 Jul. 6, 2023

(30) Foreign Application Priority Data
Dec. 30, 2021 (KR) .......................... 10-2021-0193476

(51) Int. Cl.
G06F 3/041 (2006.01)
G06F 3/044 (2006.01)
H03F 3/45 (2006.01)

(52) U.S. Cl.
CPC ........ G06F 3/04184 (2019.05); G06F 3/0412 (2013.01); G06F 3/0443 (2019.05); G06F 3/041662 (2019.05); G06F 2203/04106 (2013.01)

(58) Field of Classification Search
CPC ...... G06F 3/041; G06F 3/044; G06F 3/04184; G06F 3/0412; G06F 3/041662; G06F 3/0443; G06F 2203/04106
See application file for complete search history.

(56) References Cited

U.S. PATENT DOCUMENTS

| | | | |
|---|---|---|---|
| 2018/0188865 A1* | 7/2018 | Jang | .................... H03F 3/45179 |
| 2019/0384452 A1* | 12/2019 | Kang | .................... G06F 3/0412 |
| 2020/0401004 A1* | 12/2020 | Kang | .................... G09G 3/3655 |

* cited by examiner

*Primary Examiner* — Md Saiful A Siddiqui
(74) *Attorney, Agent, or Firm* — Fenwick & West LLP

(57) ABSTRACT

A touch display device includes a display controller configured to output a control signal and a first touch synchronization signal defining a display period and a touch period, a gate driving circuit configured to receive a high-level gate voltage and the control signal, and output a gate voltage pulse, a display panel comprising gate lines to which the gate voltage pulse is input and sub-pixels, a touch controller configured to receive the first touch synchronization signal, and output a pulse width modulation signal, and a touch power circuit configured to output a voltage generated based on the pulse width modulation signal to the gate driving circuit in at least a first period of the touch period, and output the high-level gate voltage to the gate driving circuit based on a second touch synchronization signal that defines a pseudo display period in a second period of the touch period.

20 Claims, 11 Drawing Sheets

TOUCH DISPLAY DEVICE

CROSS REFERENCE TO RELATED APPLICATION

This application claims priority from Republic of Korea Patent Application No. 10-2021-0193476, filed on Dec. 30, 2021, which is hereby incorporated by reference in its entirety.

TECHNICAL FIELD

Embodiments of the present disclosure relates to a touch display device.

BACKGROUND

As the information society develops, there is increasing the demand for a display device for displaying an image in various forms, and in recent years, various display devices such as a liquid crystal display device and an organic light emitting display device are utilized.

There may be provided, among these display devices, a touch display device which provides a touch-based input method capable of allowing a user to easily, intuitively, and conveniently input information or commands in addition to the usual input methods such as buttons, keyboards, and mouse.

The touch display device may include a touch panel manufactured and assembled separately from the display panel in order to provide a touch input function. Alternatively, the touch display device may include a display panel provided with a touch sensor capable of providing a touch sensing function as well as a display function.

Accordingly, it is required to provide a touch display device capable of providing a touch sensing function and having excellent display quality.

SUMMARY

Embodiments of the present disclosure may provide a touch display device with improved display quality in a touch display device in which the touch period and the display period are time-divided.

In one embodiment, a touch display device comprises: a display controller configured to generate and output a first touch synchronization signal and a control signal, the first touch synchronization signal defining a display period and a touch period; a gate driving circuit configured to receive a high-level gate voltage and the control signal, and generate and output a gate voltage pulse according to the high-level gate voltage and the control signal; a display panel comprising a plurality of gate lines to which the gate voltage pulse is input and a plurality of sub-pixels that are electrically connected to the plurality of gate lines; a touch controller configured to receive the first touch synchronization signal, and generate and output a pulse width modulation signal; and a touch power circuit configured to output a voltage that is generated based on the pulse width modulation signal to the gate driving circuit in at least a first period of the touch period, and output the high-level gate voltage to the gate driving circuit based on a second touch synchronization signal that defines a pseudo display period in a second period of the touch period that is after the first period.

In one embodiment, a touch display device comprises: a display panel comprising a substrate, a plurality of sub-pixels on the substrate, a plurality of data lines and a plurality of gate lines electrically connected to the plurality of sub-pixels, and a plurality of touch electrodes overlapping at least one sub-pixel among the plurality of sub-pixels; a gate driving circuit configured to receive a high-level gate voltage through a peripheral line disposed on the substrate, and output a gate voltage pulse to the plurality of gate lines according to the high-level gate voltage; a first circuit configured to output a pulse width modulation signal; a second circuit configured to output a touch electrode driving signal having a same frequency as the pulse width modulation signal to one or more of the plurality of touch electrodes; and a third circuit configured to output a signal having the same frequency as the pulse width modulation signal to the gate driving circuit through the peripheral line, the signal outputted during a period in which the second circuit outputs the touch electrode driving signal to at least one touch electrode among the plurality of touch electrodes; wherein a voltage applied to the peripheral line increases to a second voltage level that is greater than a first voltage level of a signal for display before the signal is applied to the at least one touch electrode during the display period.

In one embodiment, a touch display device comprises: a display panel comprising a substrate, a plurality of sub-pixels on the substrate, a plurality of data lines and a plurality of gate lines electrically connected to the plurality of sub-pixels, and a plurality of touch electrodes overlapping at least one sub-pixel among the plurality of sub-pixels; a plurality of signal generating circuits configured to generate a high-level gate voltage, a first touch synchronization signal defining a touch period and a display period that is after the touch period, and a second touch synchronization signal defining a first period and a second period that is after the first period, the first period overlapping a first portion of the touch period and the second period overlapping the display period and a second portion of the touch period that is after the first portion of the touch period; and a gate driving circuit configured to receive the high-level gate voltage through a peripheral line, and output a gate signal to the plurality of gate lines during the display period according to the high-level gate voltage, wherein during the second period of the second touch synchronization signal that overlaps the second portion of the touch period, the high-level gate voltage applied to the peripheral line increases from a first voltage level to a second voltage level that is greater than the first voltage level and reaches the second voltage level by at least a start of the display period defined by the first touch synchronization signal.

According to embodiments of the present disclosure, it is possible to provide a touch display device with improved display quality in a touch display device in which the touch period and the display period are time-divided.

DETAILED DESCRIPTION

Figure 1:
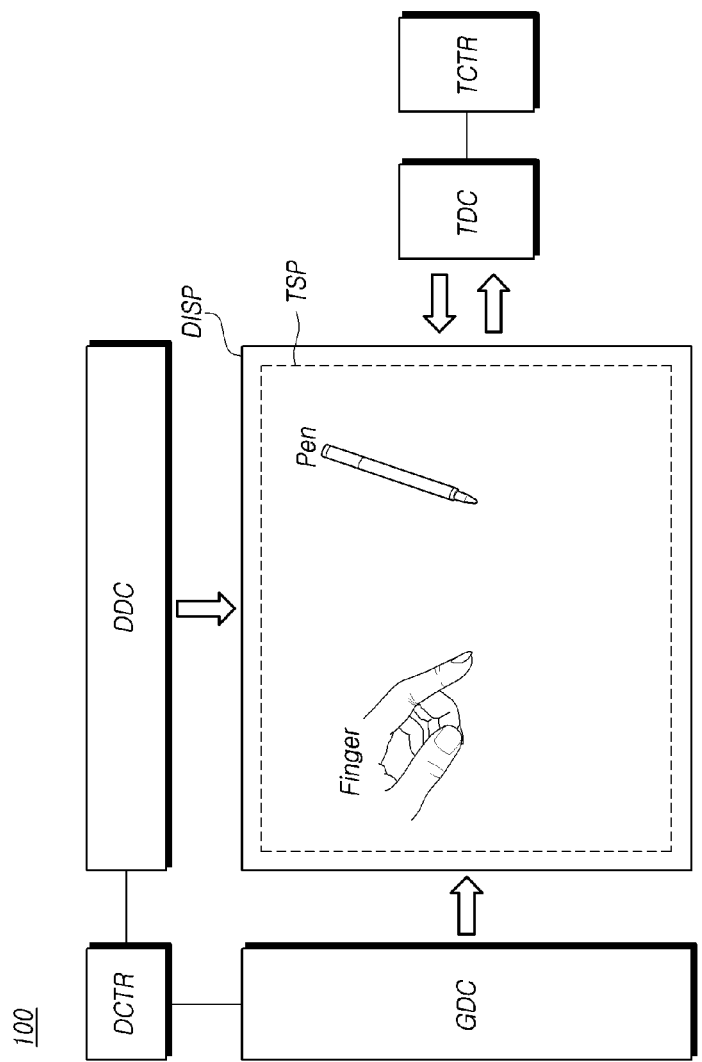
FIG. 1 is a schematic system configuration diagram of a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to the accompanying drawings.

Figure 2:
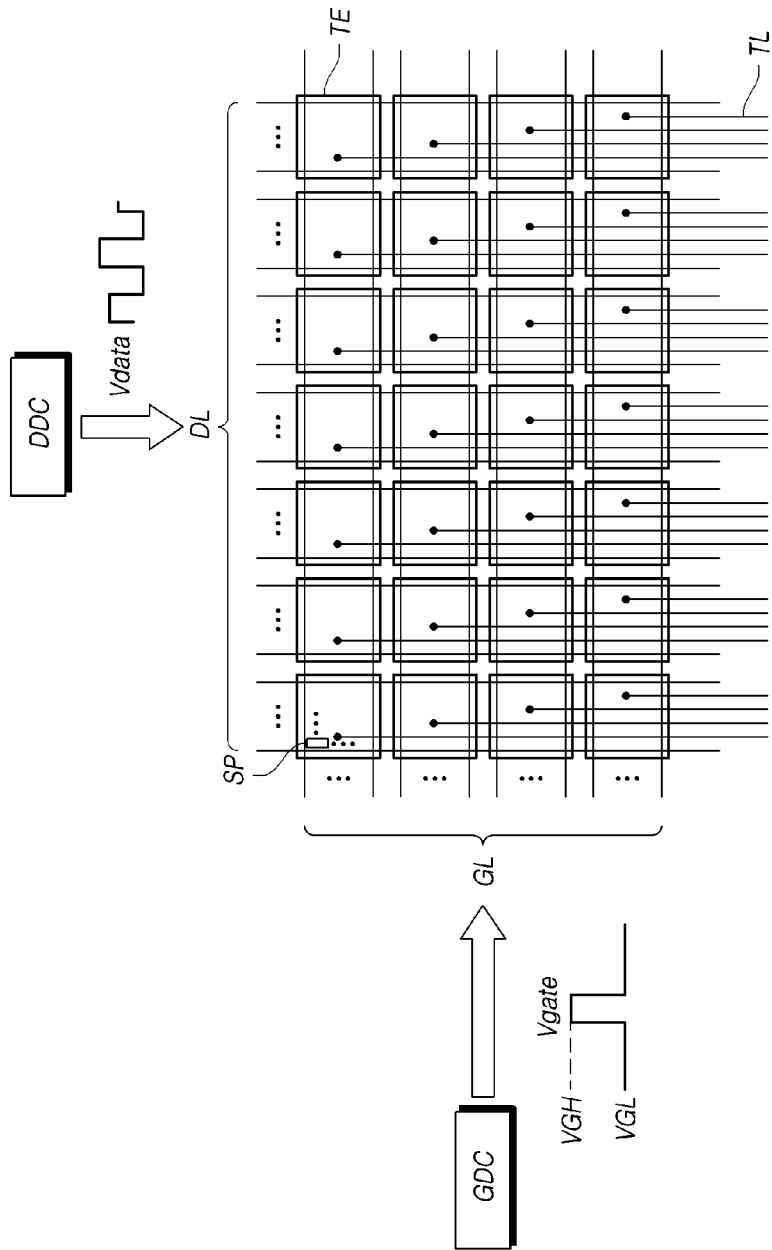
FIG. 2 schematically illustrates display driving of a touch display device according to embodiments of the present disclosure.
Figure 3:
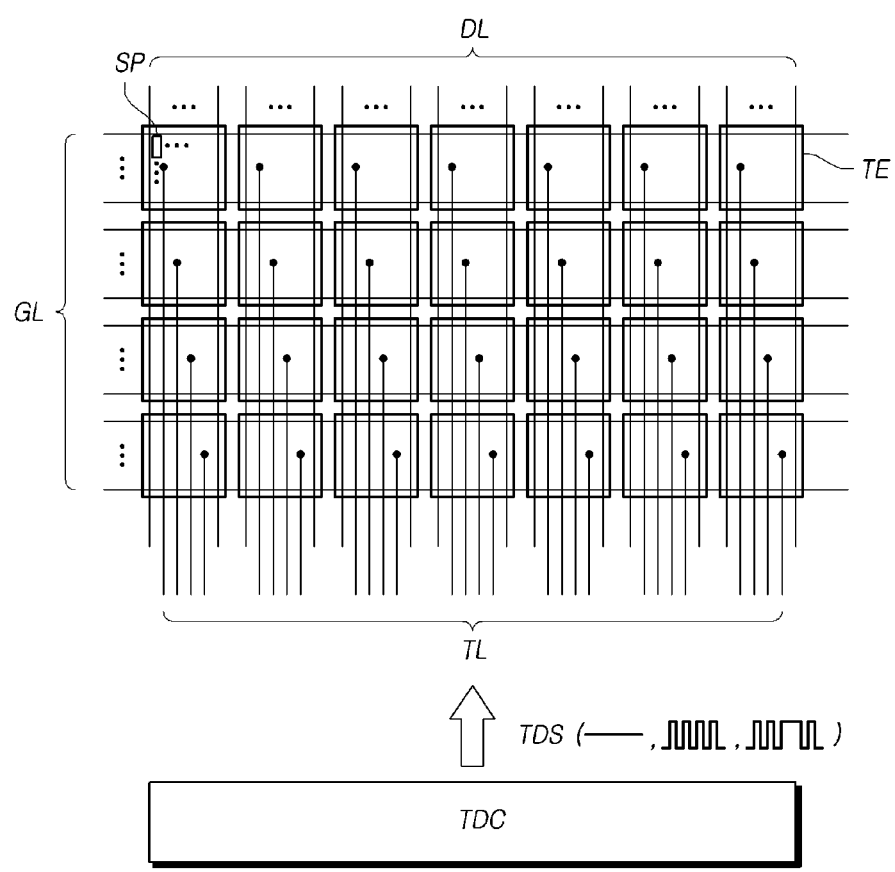
FIG. 3 schematically illustrates touch driving of the touch display device according to embodiments of the present disclosure.

FIG. 1 is a schematic system configuration diagram of a touch display device 100 according to embodiments of the present disclosure, FIG. 2 schematically illustrates display driving of a touch display device 100 according to embodiments of the present disclosure, and FIG. 3 schematically illustrates touch driving of the touch display device 100 according to embodiments of the present disclosure.

Referring to FIG. 1, a touch display device 100 according to embodiments of the present disclosure may provide a display function for displaying an image. The touch display device 100 according to embodiments of the present disclosure may provide a touch sensing function for sensing a user's touch and a touch input function for performing input processing according to a user's touch using the result of the touch sensing function.

Hereinafter, the display driving for providing a display function will be described with reference to FIGS. 1 and 2, and components for providing a touch sensing function and touch driving will be described with reference to FIGS. 1 and 3.

Referring to FIGS. 1 and 2, the touch display device 100 according to embodiments of the present disclosure may include a display panel DISP in which a plurality of data lines DL and a plurality of gate lines GL are disposed to provide a display function. A plurality of sub-pixels SP electrically connected to a plurality of data lines DL and a plurality of gate lines GL may be positioned in the display panel DISP. The touch display device 100 according to embodiments of the present disclosure may include a display panel DISP, a data driving circuit DDC configured to drive a plurality of data lines DL, a gate driving circuit GDC configured to drive the plurality of gate lines GL, and a display controller DCTR configured to control the data driving circuit DDC and the gate driving circuit GDC.

The display controller DCTR may supply various control signals to the data driving circuit DDC and the gate driving circuit GDC to control the data driving circuit DDC and the gate driving circuit GDC.

For example, in order to control the gate driving circuit GDC, the display controller DCTR may output various gate control signals GCS including a gate start pulse GSP, a gate shift clock GSC, a gate output enable signal GOE and the like.

In addition, the display controller DCTR, in order to control the data driving circuit DDC, may output various data control signals DCS including a source start pulse SSP, a source sampling clock SSC, a source output enable signal SOE and the like.

The display controller DCTR may start a scan according to the timing implemented in each frame, convert the input image data input from the outside to match the data signal format used by the data driving circuit DDC to output the converted image data, and control the data driving at the appropriate time for the scan.

The gate driving circuit GDC may sequentially supply a scan signal of an on-voltage or an off-voltage to the plurality of gate lines GL under the control of the display controller DCTR.

When a specific gate line GL is opened by the gate driving circuit GDC, the data driving circuit DDC may convert the image data signal received from the display controller DCTR into an analog signal, and supply the corresponding data signal Vdata to the plurality of data lines DL.

The display controller DCTR may be a timing controller used in a general display technology, or a control device which further performs other control functions including the timing controller, or may be a control device different from the timing controller.

The display controller DCTR may be implemented as a component separate from the data driving circuit DDC, or may be implemented as an integrated circuit together with the data driving circuit DDC.

The data driving circuit DDC may drive the plurality of data lines DL by supplying the data signal Vdata to the plurality of data lines DL. Here, the data driving circuit DDC may be also referred to as a 'source driver'.

The data driving circuit DDC may include at least one source driver integrated circuit SDIC. Each source driver integrated circuit SDIC may include a shift register, a latch circuit, a digital-to-analog converter DAC, an output buffer circuit, and the like. Each source driver integrated circuit SDIC may further include an analog-to-digital converter ADC in some cases.

Each source driver integrated circuit SDIC may be connected to the bonding pad of the display panel DISP in a tape automated bonding (TAB) method or a chip-on-glass (COG) method, or may be directly disposed on the display panel DISP, or, in some cases, may be integrated and disposed on the display panel DISP. In addition, each source driver integrated circuit SDIC may be implemented in a chip-on-film (COF) method mounted on a film connected to the display panel DISP.

The gate driving circuit GDC drives the plurality of gate lines GL by supplying a scan signal (Vgate, also referred to as a scan voltage, or a gate voltage) to the plurality of gate lines GL. Here, the gate driving circuit GDC is also referred to as a 'scan driver'.

Here, the scan signal Vgate may include an off-level gate voltage for closing the corresponding gate line GL (e.g., turn off) and an on-level gate voltage for opening the corresponding gate line GL (e.g., turn on).

More specifically, the scan signal Vgate may be configured as an off-level gate voltage which turns off a transistor connected to the corresponding gate line GL, and an on-level gate voltage which turns on the transistor connected to the corresponding gate line GL.

In the case that the transistor is an N-type, the off-level gate voltage may be a low-level gate voltage VGL, and the on-level gate voltage may be a high-level gate voltage VGH that is greater than the off-level gate voltage. If the transistor is a P-type, the off-level gate voltage may be the high-level gate voltage VGH, and the on-level gate voltage may be the low-level gate voltage VGL that is less than the on-level gate voltage. Hereinafter, for convenience of description, it is assumed that the off-level gate voltage is the low-level gate voltage VGL and the on-level gate voltage is the high-level gate voltage VGH.

The gate driving circuit GDC may include at least one gate driver integrated circuit GDIC. Each gate driver integrated circuit GDIC may include a shift register, a level shifter, and the like.

Each gate driver integrated circuit GDIC may be connected to a bonding pad of the display panel DISP by a tape automated bonding (TAB) method or a chip-on-glass (COG) method, or may be implemented as a gate-in-panel (GIP) type and disposed directly on the display panel DISP, or may be integrated and disposed on the display panel DISP in some cases. In addition, each gate driver integrated circuit GDIC may be implemented in a chip-on-film (COF) method which is mounted on a film connected to the display panel DISP.

The data driving circuit DDC may be located only on one side (e.g., upper or lower side) of the display panel DISP as shown in FIG. 1, or, in some cases, may be located on both sides (e.g., upper and lower sides) of the display panel DISP according to a driving method, a panel design method, and the like.

The gate driving circuit GDC may be located only on one side (e.g., left or right side) of the display panel DISP, as in FIG. 1, and in some cases, may be located on both sides (e.g., left and right side) of the display panel DISP according to a driving method, a panel design method, and the like.

The touch display device 100 according to embodiments of the present disclosure may be various types of display devices, such as a liquid crystal display device and an organic light emitting display device. The display panel DISP according to embodiments of the present disclosure may also be a display panel of various types, such as a liquid crystal display panel and an organic light emitting display panel.

Each sub-pixel SP positioned in the display panel DISP may include one or more circuit elements (e.g., a transistor, a capacitor, etc.).

For example, in the case that the display panel DISP is a liquid crystal display panel, a pixel electrode may be disposed in each sub-pixel SP, and a transistor may be electrically connected between the pixel electrode and the data line DL. The transistor may be turned on by the scan signal Vgate supplied to the gate node through the gate line GL. When turned on, the transistor outputs the data signal Vdata supplied to the source node (or drain node) through the data line DL to the drain node (or source node). The transistor may apply the data signal Vdata to the pixel electrode electrically connected to the drain node (or the source node). An electric field may be formed between the pixel electrode to which the data signal Vdata is applied and the common electrode to which the common voltage Vcom is applied, and a capacitance may be formed between the pixel electrode and the common electrode.

The structure of each sub-pixel SP may be variously determined according to a panel type, a function provided, a design method, and the like.

Referring to FIGS. 1 and 3, the touch display device 100 according to embodiments of the present disclosure may include, in order to provide a touch sensing function, a touch panel TSP, a touch driving circuit TDC for driving and sensing the touch panel TSP, and a touch controller TCTR which detects touch presence and/or touch coordinates using a result of the touch driving circuit TDC sensing the touch panel TSP.

The touch panel TSP may be touched or approached by a user's pointer. Touch sensors may be disposed on the touch panel TSP.

Here, the user's pointer may be a finger or a pen in one embodiment.

The pen may be a passive pen without a signal transmission/reception function or an active pen with a signal transmission/reception function. The touch driving circuit TDC may supply a touch driving signal to the touch panel TSP and sense the touch panel TSP. The touch controller TCTR may sense a touch using a result of the touch driving circuit TDC sensing the touch panel TSP. Here, sensing the touch may mean detecting the presence or absence of a touch and/or touch coordinates.

The touch panel TSP may be an external type disposed outside the display panel DISP, or may be an internal type disposed inside the display panel DISP.

If the touch panel TSP is of an external type, the touch panel TSP and the display panel DISP may be separately manufactured and then coupled by an adhesive or the like. An external touch panel TSP is also called an add-on type.

If the touch panel TSP is an internal type or a built-in type, the touch panel TSP may be manufactured together during a process of manufacturing the display panel DISP. That is, touch sensors constituting the touch panel TSP may be disposed inside the display panel DISP. The internal touch panel TSP may be an in-cell type, an on-cell type, or a hybrid type.

Meanwhile, hereinafter, for convenience of description, it is assumed that the touch panel TSP is an internal type in which the touch panel TSP is embedded in the display panel DISP.

In the case that the touch panel TSP is embedded in the display panel DISP, that is, in the case that a plurality of touch electrodes TE are disposed in the display panel DISP, a plurality of touch electrodes TE may be configured in the display panel DISP separately from electrodes used for display driving, or the electrodes disposed on the display panel DISP for display driving may be utilized as a plurality of touch electrodes TE.

For example, a plurality of common electrodes disposed on the display panel DISP may be divided into and used as a plurality of touch electrodes TE. That is, the plurality of touch electrodes TE disposed on the display panel DISP may be electrodes for touch sensing and electrodes for display driving. Hereinafter, it is assumed that the plurality of touch electrodes TE disposed on the display panel DISP are common electrodes.

The touch controller TCTR may be implemented as, for example, a micro control unit (MCU), a processor, or the like.

The display controller DCTR and the touch controller TCTR may be implemented separately or may be integrated.

Referring to FIG. 3, in the touch panel TSP of the touch display device 100 according to embodiments of the present disclosure, there may be disposed a plurality of touch electrodes TE, and a plurality of touch lines TL configured to electrically connect the plurality of touch electrodes TE and the touch driving circuit TDC. The plurality of touch electrodes TE may be arranged in a matrix form. Each of the plurality of touch electrodes TE may be electrically connected to one or more touch lines TL through one or more contact holes.

The touch display device 100 according to embodiments of the present disclosure may sense a touch based on the self-capacitance of the touch electrode TE, or a mutual-capacitance between the touch electrodes TE.

If the touch display device 100 according to embodiments of the present disclosure senses a touch based on self-capacitance, in the touch panel TSP, a plurality of first touch electrode lines and a plurality of second touch electrode lines may be disposed to cross each other. For example, the plurality of first touch electrode lines may be disposed in the X-axis direction (e.g., a first direction), and the plurality of second touch electrode lines may be disposed in the Y-axis direction (e.g., a second direction). Here, each of the first touch electrode line and the second touch electrode line may be one touch electrode in the form of a bar, or may be in a form in which two or more touch electrodes are electrically connected. The first touch electrode lines may be referred to as a driving line, a driving electrode, a driving touch electrode line, a Tx line, a Tx electrode, or a Tx touch electrode line. The second touch electrode lines may be a receiving line, a receiving electrode, a receiving touch electrode line, a sensing line, a sensing electrode, a sensing touch electrode line, an Rx line, an Rx electrode, or an Rx touch electrode line.

In this case, the touch driving circuit TDC may supply a driving signal to one or more of the plurality of first touch electrode lines, sense the second touch electrode lines to output sensing data, and the touch controller TCTR may calculate touch presence and/or touch coordinates by using the sensed data.

In the case that the touch display device 100 according to embodiments of the present disclosure senses a touch based on mutual-capacitance, as shown in FIG. 3, a plurality of touch electrodes TE may be disposed on the touch panel TSP to be separated from each other.

In this case, the touch driving circuit TDC may supply a driving signal (hereinafter referred to as a touch electrode driving signal TDS) to all or a part of the plurality of touch electrodes TE, and may sense one or more touch electrodes TE to which a driving signal is supplied and output sensing data. The touch controller TCTR may calculate touch presence and/or touch coordinates by using the sensed data.

Hereinafter, for convenience of description, it is assumed that the touch display device according to embodiments of the present disclosure senses a touch based on self-capacitance, and the touch panel TSP is configured as shown in FIGS. 2 and 3.

The touch electrode driving signal TDS output from the touch driving circuit TDC may be a signal having a constant voltage or a signal having a variable voltage.

If the touch electrode driving signal TDS is a signal with a variable voltage, the touch electrode driving signal TDS may have various signal waveforms such as, for example, a sinusoidal wave shape, a triangular wave shape, or a square wave shape.

Hereinafter, when the touch electrode driving signal TDS is a signal with a variable voltage, it is assumed that the touch electrode driving signal TDS is a pulse signal composed of several pulses. In the case that the touch electrode driving signal TDS is a pulse signal composed of several pulses, the touch electrode driving signal TDS may have a constant frequency or a variable frequency.

Referring to FIGS. 2 and 3, the size of the area occupied by one touch electrode TE may correspond to the size of the area occupied by one sub-pixel SP, or the size of the area occupied by two or more sub-pixels SP. That is, each of the plurality of touch electrodes TE may overlap two or more sub-pixels SP.

In the case that the plurality of touch electrodes TE are arranged in a matrix form, and the first and second touch electrodes among the plurality of touch electrodes TE are arranged in the same column (or the same row), two or more data lines DL overlapping the first touch electrode may overlap the second touch electrode. The two or more gate lines GL overlapping the first touch electrode may not overlap the second touch electrode.

The plurality of touch electrode columns (or touch electrode rows) may be disposed parallel to the plurality of data lines DL. The plurality of touch lines TL may be disposed parallel to the plurality of data lines DL.

A plurality of touch electrodes TE are arranged in one touch electrode column (or touch electrode row), and the plurality of touch lines TL electrically connected to the plurality of touch electrodes TE may overlap the plurality of touch electrodes TE.

For example, it is assumed that the plurality of touch electrodes TE arranged in one touch electrode column include a first touch electrode and a second touch electrode, and the first touch line electrically connects the first touch electrode and the touch driving circuit TDC, and the second touch line electrically connects the second touch electrode and the touch driving circuit TDC. In this case, the first touch line electrically connected to the first touch electrode overlaps the second touch electrode (the touch electrode disposed in the same column as the first touch electrode), but may be electrically insulated (separated) from the second touch electrode in the display panel DISP. Meanwhile, the first touch line and the second touch line may be short-circuited in the touch driving circuit TDC according to driving conditions or necessity.

Figure 4:
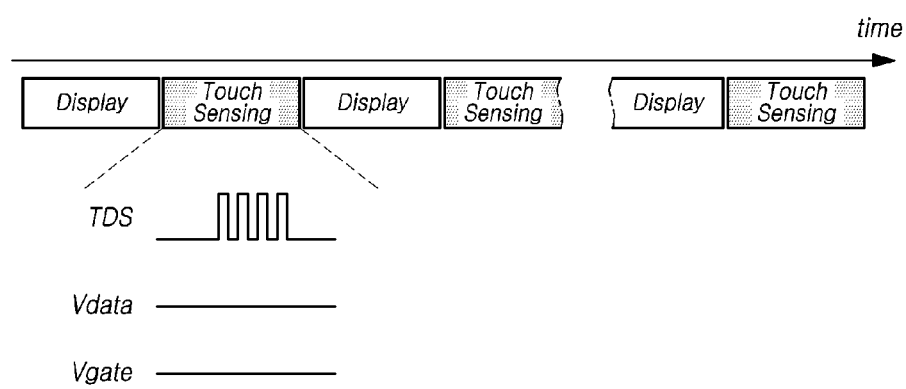
FIGS. 4 and 5 are diagrams for explaining a time division driving (TDD) method of a touch display device according to embodiments of the present disclosure.
Figure 5:
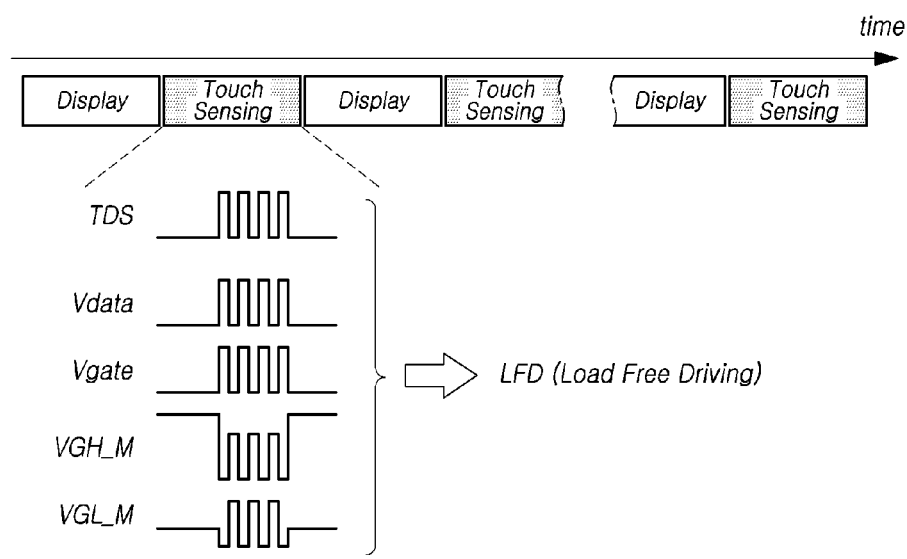

FIGS. 4 and 5 are diagrams for explaining a time division driving (TDD) method of a touch display device according to embodiments of the present disclosure.

Referring to FIG. 4, the touch display device according to embodiments of the present disclosure may alternately perform display and touch sensing. As described above, a method in which driving for display and touch driving for touch sensing are performed alternately may be referred to as time division driving or time-divided driving.

According to this time division driving method, a display period (e.g., display in FIG. 4) for display and a touch period (e.g., touch sensing in FIG. 4) for touch sensing may alternate. During the display period, the touch display device may perform display driving. During the touch period, the touch display device may perform touch driving.

Referring to FIG. 4, according to the time division driving method, the touch electrode driving signal TDS may be applied to one or more of the plurality of touch electrodes TE during the touch period. In this case, the plurality of data lines DL and the plurality of gate lines GL may not be driven. Accordingly, the touch period may be a blank period.

In this case, there may be formed the unnecessary parasitic capacitance due to a potential difference between the touch electrode TE to which the touch electrode driving signal TDS is applied and one or more data lines DL positioned around the touch electrode TE. Such unnecessary parasitic capacitance may decrease touch sensitivity by increasing a resistor-capacitor (RC) delay for the touch electrode TE and the touch line TL connected thereto.

In addition, there may be formed the unnecessary parasitic capacitance due to a potential difference between the touch electrode TE to which the touch electrode driving signal TDS is applied and one or more gate lines GL located around the touch electrode TE. Such unnecessary parasitic capacitance may increase the RC delay for the touch electrode TE and the touch line TL connected thereto, thereby reducing touch sensitivity.

In addition, unnecessary parasitic capacitance may be formed due to a potential difference between the touch electrode TE to which the touch electrode driving signal TDS is applied and one or more gate lines GL located around the touch electrode TE. Such unnecessary parasitic capacitance may increase the RC delay of the touch electrode TE and the touch line TL connected thereto, thereby reducing touch sensitivity.

Furthermore, unnecessary parasitic capacitance may be formed due to a potential difference between the touch electrode TE to which the touch electrode driving signal TDS is applied and one or more other touch electrodes TE positioned around the touch electrode TE. Such unnecessary parasitic capacitance may increase the RC delay for the touch electrode TE and the touch line TL connected thereto, thereby reducing touch sensitivity.

The above-mentioned RC delay may be also called a time constant or a load.

In order to remove such a load, the touch display device according to embodiments of the present disclosure may perform load-free driving (LFD) during a touch period.

In the touch display device according to the embodiments of the present disclosure, when the touch electrode driving signal TDS is applied to all or part of the plurality of touch electrodes TE during load-free driving, a load-free driving signal may be applied as the data signal Vdata to all the data lines DL or to some data lines DL in which parasitic capacitance is likely to be formed.

In the touch display device according to the embodiments of the present disclosure, when the touch electrode driving signal TDS is applied to all or part of the plurality of touch electrodes TE during load-free driving, a load-free driving signal may be applied as the scan signal Vgate to all the gate lines GL or to some gate lines GL in which parasitic capacitance is likely to be formed.

In the touch display device according to the embodiments of the present disclosure, when the touch electrode driving signal TDS is applied to all or part of the plurality of touch electrodes TE during load-free driving, a load-free driving signal may be applied as the scan signal Vgate to all the touch electrode TE or to some other touch electrodes TE in which parasitic capacitance is likely to be formed.

During the load-free driving, the pixel electrode may be in a floating state to which a constant voltage is not applied. Accordingly, the voltage of the pixel electrode may be changed by the touch electrode driving signal or the load-free driving signal applied to the at least one touch electrode. Accordingly, the voltage difference between the common electrode and the pixel electrode may be maintained even during the touch period.

Meanwhile, referring to FIG. 5, the touch display device according to the embodiments of the present disclosure may include a line to which a gate voltage (e.g., a low-level gate voltage VGL, a high-level gate voltage VGH, etc.) input to the gate driving circuit is applied.

For example, the display panel according to the embodiments of the present disclosure may includes a peripheral line (not shown) configured to transmit the high-level gate voltage VGH to the gate driving circuit, and a peripheral line (not shown) configured to transmit the low-level gate voltage VGL to the gate driving circuit. The peripheral lines may be located in the non-display area. The peripheral lines, for example, may be disposed in a line-on-glass (LOG) type.

In the case that a high-level gate voltage VGH or a low-level gate voltage VGL of a preset level is applied to the lines during the touch period, the touch sensing sensitivity in the touch electrode positioned adjacent to the lines may be reduced.

Accordingly, the display device according to the embodiments of the present disclosure may apply the high-level gate voltage VGH_M of which the pulse width is modulated during the touch period to the line applying the high-level gate voltage. In addition, the display device according to the exemplary embodiments of the present disclosure may apply the low-level gate voltage VGL_M of which the pulse width is modulated during the touch period to the line applying the low-level gate voltage.

Accordingly, in the load-free driving, the pulse width modulated high-level gate voltage VGH_M and the pulse width modulated low-level gate voltage VGL_M may be applied to the lines positioned in the non-display area.

The load-free driving signal may be a touch electrode driving signal, or a signal having the same or similar signal characteristics to the touch electrode driving signal. For example, the frequency and phase of the load-free driving signal may be the same as the frequency and phase of the touch electrode driving signal TDS, or may be the same within a predetermined error range. In addition, the amplitude of the load-free driving signal and the amplitude of the touch electrode driving signal TDS may be the same or may be the same within a predetermined error range, and in some cases, there may be an intentional difference.

Figure 6:
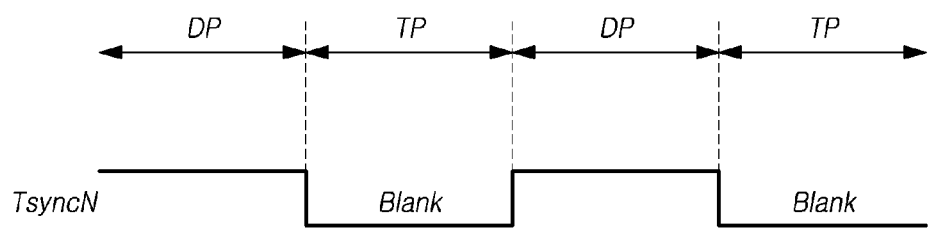
FIG. 6 exemplarily illustrates a first touch synchronization signal defining a display period and a touch period of a touch display device according to embodiments of the present disclosure.

FIG. 6 exemplarily illustrates a first touch synchronization signal TsyncN defining a display period DP and a touch period TP of a touch display device according to embodiments of the present disclosure.

Referring to FIG. 6, a touch display device according to embodiments of the present disclosure may generate a first touch synchronization signal TsyncN swinging (e.g., alternating) to a high-level and a low-level to define the display period DP or define the touch period TP.

For example, a high-level period (or a low-level period) of the touch synchronization signal TsyncN may correspond to the display period DP. Alternatively, a low-level period (or a high-level period) of the touch synchronization signal TsyncN may correspond to the touch period TP.

Meanwhile, in relation to a method of allocating the display period DP and the touch period TP within one frame period in which an image is displayed, for example, one frame period may be time-divided into one display period DP and one touch period TP. Display driving may be performed during one display period DP, and touch driving for sensing a touch input by a finger and/or an active pen may be performed during one touch period TP corresponding to a blank period.

As another example, one frame period may be time-divided into two or more display periods DP and two or more touch periods TP. Display driving for displaying one frame may be performed during two or more display periods DP within one frame period. During two or more touch periods TP corresponding to the blank period within one frame period, touch driving for sensing a touch input by a finger and/or an active pen in the entire screen area is performed once or twice or more, or touch driving for sensing a touch input by a finger and/or an active pen in a partial area of the screen may be performed.

Meanwhile, in the case that one frame period is time-divided into two or more display periods DP and two or more touch periods TP, each of two or more blank periods corresponding to two or more touch periods TP within one frame period may be referred to as a "long horizontal blank LHB".

Here, touch driving performed during two or more LHBs within one frame period may be referred to as "LHB driving".

Figure 7:
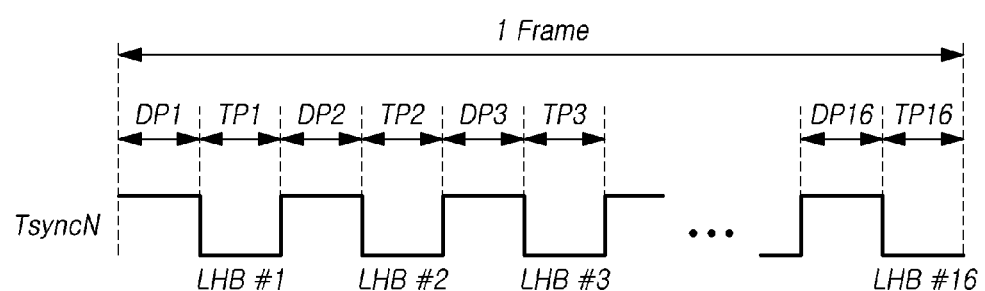
FIG. 7 is an exemplary diagram of a case in which one frame period includes time-divided display periods and touch periods in a touch display device according to embodiments of the present disclosure.

FIG. 7 is an exemplary diagram of a case in which one frame period includes a plurality of time-divided display periods DP1~DP16 and a plurality of touch periods TP1~TP16 in a touch display device according to embodiments of the present disclosure.

Referring to FIG. 7, one frame period may be time-divided into 16 display periods DP1 to DP16 and 16 touch periods TP1 to TP16, for example.

In this case, 16 touch periods TP1 to TP16 correspond to 16 LHBs LHB #1 to LHB #16.

Figure 8:
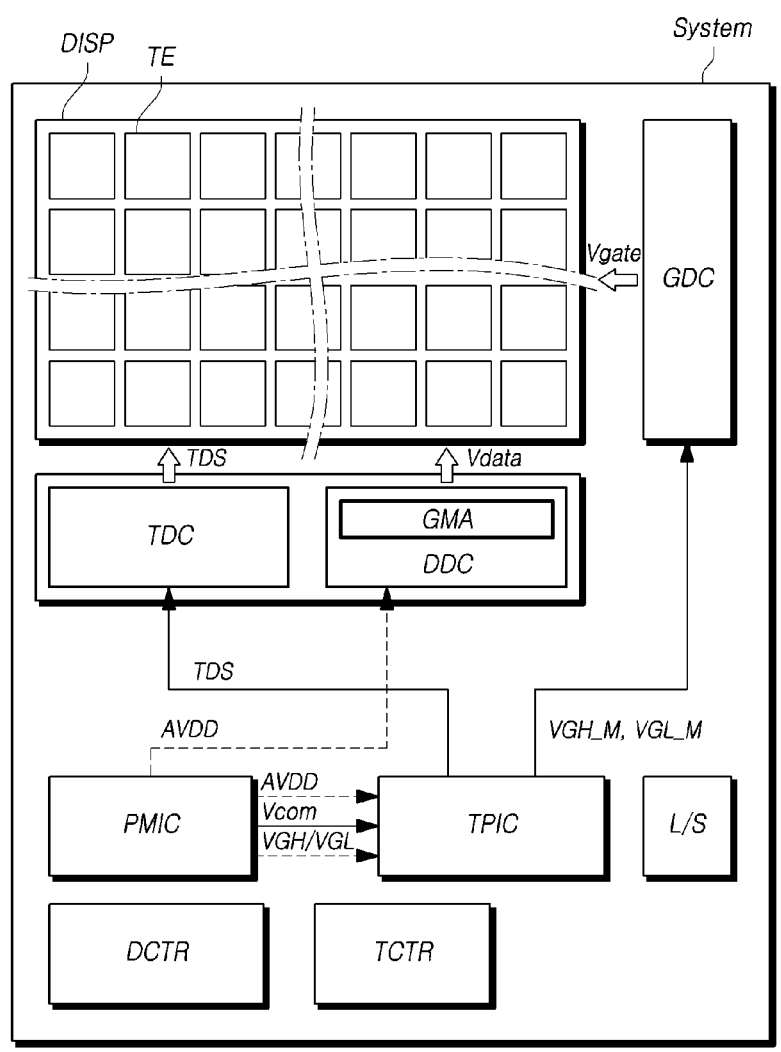
FIG. 8 illustrates a load-free driving system of a touch display device according to embodiments of the present disclosure.

FIG. 8 illustrates a load-free driving system of a touch display device according to embodiments of the present disclosure.

Referring to FIG. 8, a touch display device according to embodiments of the present disclosure may include a display panel DISP in which a plurality of data lines DL and a plurality of gate lines GL are positioned and a plurality of touch electrodes TE are positioned, a gate driving circuit GDC electrically connected to the plurality of gate lines GL and configured to drive the plurality of gate lines GL, a data driving circuit DDC electrically connected to the plurality of data lines DL and configured to drive the plurality of data lines DL, and a touch driving circuit TDC electrically connected to the plurality of touch electrodes TE and configured to drive the plurality of touch electrodes TE.

In addition, the touch display device according to embodiments of the present disclosure may further include a display controller DCTR (e.g., a circuit) for controlling driving operations of a data driving circuit DDC and a gate driving circuit GDC, and a touch controller TCTR for controlling a driving operation of the touch driving circuit TDC or calculating touch presence and/or touch coordinates using sensing data output from the touch driving circuit TDC.

In addition, the touch display device according to embodiments of the present disclosure may further include a power control circuit for supplying power. The power control circuit may include a touch power (integrated) circuit TPIC and a power management (integrated) circuit PMIC.

Referring to FIG. 8, the touch power circuit TPIC may supply the touch electrode driving signal TDS necessary for driving the touch electrode TE to the touch driving circuit TDC.

Alternatively, from that shown in FIG. 8, the touch power circuit TPIC may generate the touch electrode driving signal TDS and output the generated touch electrode driving signal TDS to the touch controller TCTR. The touch controller TCTR may output the input touch electrode driving signal TDS to the touch driving circuit TDC.

The touch power circuit TPIC may generate and output a touch electrode driving signal TDS for touch sensing based on a modulation signal (e.g., a pulse width modulation signal) received from the touch controller TCTR.

The power management circuit PMIC may supply various voltages (AVDD, Vcom, VGH, VGL, etc.) necessary for signal supply of the touch power circuit TPIC to the touch power circuit TPIC.

The power management circuit PMIC may supply various direct current (DC) voltages (such as AVDD) necessary for data driving of the data driving circuit DDC to the data driving circuit DDC.

The touch controller TCTR may supply a pulse width modulation (PWM) signal for outputting or generating various signals (e.g., TDS, etc.) in circuits such as a touch power circuit TPIC, a touch driving circuit TDC or a data driving circuit DDC. The touch controller TCTR may be implemented as, for example, a micro control unit (MCU), a processor, or the like.

The touch power circuit TPIC may modulate and output the common voltage Vcom input from the power management circuit PMIC based on a pulse width modulation (PWM) signal input from the touch controller TCTR. Accordingly, the touch power circuit TPIC may generate and output a common voltage pulse whose pulse width is modulated according to a voltage pulse corresponding to a pulse width modulation (PWM) signal.

The touch power circuit TPIC may modulate and output a gate voltage (e.g., high-level gate voltage VGH, low-level gate voltage VGL, etc.) input from the power management circuit PMIC based on a pulse width modulation (PWM) signal input from the touch controller TCTR during the touch period. Accordingly, the touch power circuit TPIC may generate and output a high-level gate voltage VGH_M of which a pulse width is modulated and a low-level gate voltage VGL_M of which a pulse width is modulated according to a voltage pulse corresponding to a pulse width modulation (PWM) signal.

For example, the touch power circuit TPIC may output the high-level gate voltage VGH_M of which the pulse width is modulated during the touch period to the gate driving circuit through a peripheral line (not shown). Also, the touch power circuit TPIC may output the high-level gate voltage VGH to the gate driving circuit through the peripheral line during the display period.

In addition, the touch display device according to embodiments of the present disclosure may further include one or more level shifters US for changing voltage levels of various signals.

These one or more level shifters US may be implemented separately from the data driving circuit DDC, the gate driving circuit GDC, the touch driving circuit TDC, the touch power circuit TPIC, the power management circuit PMIC, the display controller DCTR, the touch controller TCTR, and the like. Alternatively, the level shifters US may be implemented to be included as one or more of the internal modules of at least one of the data driving circuit DDC, the gate driving circuit GDC, the touch driving circuit TDC, the touch power circuit TPIC, the power management circuit PMIC, the display controller DCTR, and the touch controller TCTR.

The touch driving circuit TDC and the data driving circuit DDC may each be implemented as separate integrated circuits, or both the touch driving circuit TDC and the data driving circuit DDC may be included in one integrated circuit.

For example, an integrated circuit having a function of a touch driving circuit TDC may be formed as a touch readout integrated circuit ROIC. The integrated circuit having the function of the data driving circuit DDC may be formed as a source driver integrated circuit SDIC. An integrated circuit having both the functions of the touch driving circuit TDC and the data driving circuit DDC may be formed as a source driver and touch readout integrated circuit SRIC.

The touch driving circuit TDC, the data driving circuit DDC, and the touch controller TCTR may be implemented as different integrated circuits, respectively, or two or more circuits among the touch driving circuit TDC, the data driving circuit DDC, and the touch controller TCTR may be located in one integrated circuit.

Figure 9:
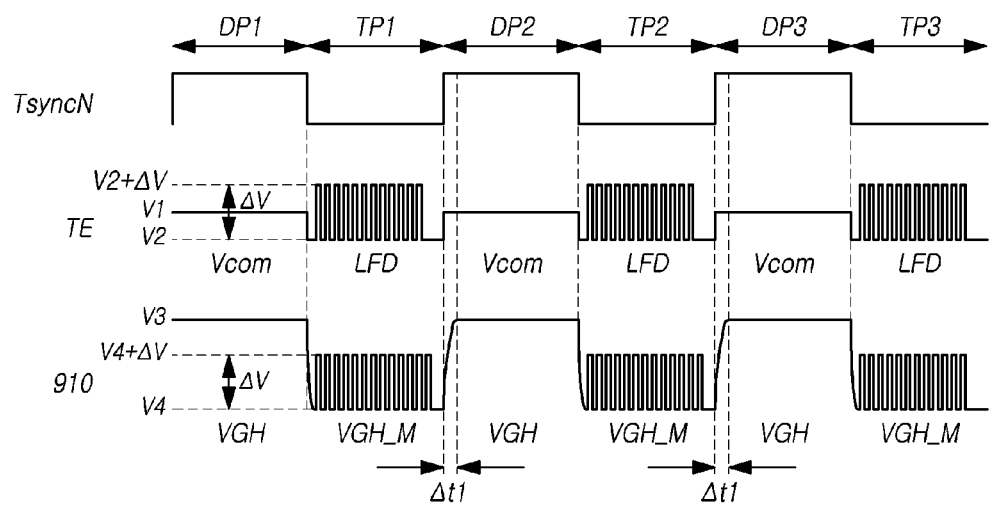
FIG. 9 illustrates display driving or touch driving performed based on a first touch synchronization signal in a touch display device according to embodiments of the present disclosure.

FIG. 9 illustrates display driving or touch driving performed based on a first touch synchronization signal TsyncN in a touch display device according to embodiments of the present disclosure;

Referring to FIG. 9, the first touch synchronization signal TsyncN may define a display period DP and a touch period TP, respectively.

For example, a high-level period of the first touch synchronization signal TsyncN may be the display period DP. In addition, a low-level period of the first touch synchronization signal TsyncN may be the touch period TP.

Referring to FIG. 9, the level of the voltage applied to the touch electrode TE during the display period DP may be a first voltage level V1. The first voltage level V1 may be, for example, the level of the common voltage Vcom.

Meanwhile, a constant voltage having a voltage level different from that of the common voltage Vcom may be applied to the touch electrode TE during the display period DP.

In addition, in some cases, a pulse for touch sensing may be input to one or more touch electrodes TE during the display period DP. For example, a signal for sensing the active stylus pen may be input to the touch electrode TE. For example, a signal for recognizing a touch of a passive stylus pen or a finger may be input to the touch electrode TE.

Figure 10:
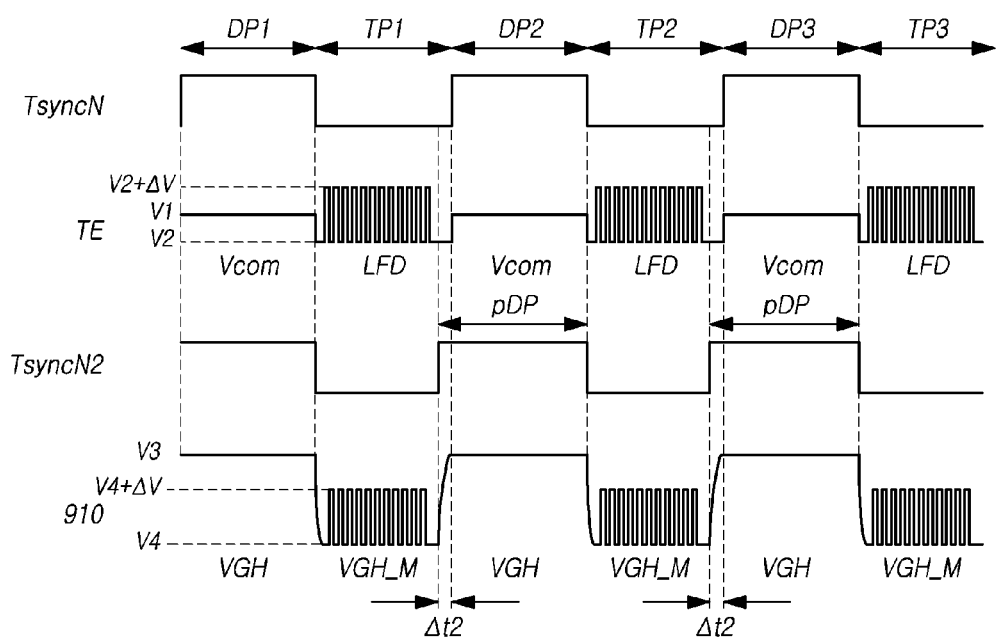
FIG. 10 is a diagram for explaining a second touch synchronization signal defining a start of a pseudo display period in a display device according to embodiments of the present specification.

During the touch period TP, the voltage level of the touch electrode TE may vary from a second voltage level V2 to the preset voltage level V2+ΔV. During the touch period TP, the touch electrode driving signal TDS or the same signal (e.g., a load-free driving signal, etc.) may be applied to the touch electrode TE. In FIGS. 9 and 10, it will be described as an example a case in which the load-free driving signal is applied to the touch electrode TE, and the load-free driving signal applied to the touch electrode TE will be described as an LFD signal.

The first voltage level V1 may be between the second voltage level V2 and a preset voltage level V2+ΔV. Accordingly, the voltage level of the touch electrode TE may be saturated to the first voltage level V1 within a relatively fast time from the start of the display period DP.

Meanwhile, referring to FIG. 9, the level of the voltage applied to a peripheral line 910 during the display period DP may be a third voltage level V3. The third voltage level V3 may be a high-level gate voltage VGH. The peripheral line 910 may refer to a line electrically connecting the touch power circuit TPIC and the gate driving circuit GDC. The third voltage level V3 may be an on-level voltage of a transistor disposed in the sub-pixel.

The voltage applied to the peripheral line 910 during the touch period TP may vary from a fourth voltage level V4 to the preset voltage level V4+ΔV. The voltage applied to the peripheral line 910 during the touch period TP may be a high-level gate voltage VGH_M of which a pulse width is modulated.

In some cases, the fourth voltage level V4 may be the same as the second voltage level V2. In this case, the touch power circuit may not separately generate the pulse width modulated high-level gate voltage VGH_M input to the peripheral line 910, but may output the same signal as the touch driving signal TDS or the load-free driving signal LFD to the peripheral line 910 as it is. Accordingly, there may provide an advantage of in that the design of the touch power circuit becomes simpler.

Referring to FIG. 9, the third voltage level V3 may be greater than the fourth voltage level V4 and the preset voltage level V4+ΔV. Accordingly, after a relatively long time elapses from the start of the display period DP, the level of the voltage applied to the peripheral line 910 may be saturated to the third voltage level V3.

Referring to FIG. 9, the voltage applied to the peripheral line 910 is saturated to the third voltage level V3 of an on-level voltage after the display period DP starts and a first period Δt1 elapses. For example, after a second display period DP2 starts and the first period Δt1 elapses, the voltage applied to the peripheral line 910 is saturated to the third voltage level V3. Then, after a third display period DP3 starts and the first period Δt1 lapses, the voltage applied to the peripheral line 910 is saturated to the third voltage level V3.

Meanwhile, the start of the display period DP may be defined as a time point at which the voltage applied to the touch electrode TE is changed to the first voltage level V1 after the voltage applied to the at least one touch electrode TE stops changing in the preset voltage range.

For example, referring to FIG. 9, after the voltage applied to the touch electrode TE during the first touch period TP1 stops changing within a preset voltage range, a constant voltage of the second voltage level V2 is applied to the touch electrode TE. Thereafter, the voltage applied to the touch electrode TE starts to increase, and a constant voltage of the first voltage level V1 is applied to the touch electrode TE. A time point at which the voltage applied to the touch electrode TE increases to the first voltage level V1 may also be defined as a time point at which the second display period DP2 starts.

Accordingly, even when a time point at which the voltage level of the touch electrode TE starts to change up to the first voltage level V1 and a time point at which the voltage level of the voltage applied to the peripheral line 910 starts to change up to the third voltage level V3 are the same, there may be a difference between a time point when the voltage level of the touch electrode TE reaches the first voltage level V1 and a time point when the voltage level of the voltage applied to the peripheral line 910 reaches the third voltage level V3.

Accordingly, the luminance of the sub-pixels to which the scan signal is applied during the first period Δt1 may be different from the intended case. For example, there may occur a defect such as a partially dark horizontal line in an image.

Referring to FIGS. 8 and 9, when the touch power circuit TPIC outputs the high-level gate voltage VGH to the peripheral line 910 based on the first touch synchronization signal TsyncN, the gate driving circuit GDC cannot output the high-level gate voltage VGH that is the basis of the gate signal (scan signal) at a time point of the start of the display period DP. Therefore, there is a need for a solution to this problem.

FIG. 10 is a diagram for explaining a second touch synchronization signal TsyncN2 defining a start of a pseudo display period pDP in a display device according to embodiments of the present disclosure. In one embodiment, the second touch synchronization signal includes a first period that overlaps a first portion of touch period (e.g., TP1) defined by the first touch synchronization signal TsyncN and a second period (e.g., pDP) that overlaps a second portion of the touch period (e.g., TP1) and a display period that is after the touch period (e.g., DP2).

Hereinafter, in order to distinguish the display period DP and the pseudo display period pDP, the display period DP is also referred to as an actual display period DP.

Referring to FIG. 10, the voltage applied to the peripheral line 910 starts to increase to the third voltage level V3 when the pseudo display period pDP starts. For example, the voltage applied to the peripheral line 910 may increase from the fourth voltage level V4 to the third voltage level V3 when the pseudo display period pDP starts.

The starting time of the pseudo display period pDP may be earlier than the starting time of the actual display period DP. That is, the starting time of the pseudo display period pDP is any one time point in the touch period TP.

Meanwhile, the starting time of the pseudo display period pDP may be also defined as the time point when the voltage applied to the peripheral line 910 starts to increase from the fourth voltage level V4 to the third voltage level V3.

In addition, the starting time of the pseudo display period pDP may be within a period in which the voltage level of the touch electrode TE is the second voltage level V2.

Referring to FIG. 10, the period during which the voltage level of the peripheral line 910 increases from the fourth voltage level V4 to the third voltage level V3 may be included in the touch period TP and the pseudo display period pDP.

The time interval between the starting time of the pseudo display period pDP and the starting time of the actual display period DP may be a second time interval Δt2. The second time interval Δt2 may be a preset value.

The second time interval Δt2 may be greater than or equal to the first time interval Δt1. That is, the time interval between the starting time of the pseudo display period pDP and the starting time of the actual display period DP may be greater than or equal to a time interval during which the voltage level of the peripheral line 910 is saturated to the third voltage level V3.

For example, the length of the second time interval Δt2 may be greater than or equal to the time required for the voltage level of the peripheral line 910 to increase from the fourth voltage level V4 to reach the third voltage level V3.

Accordingly, when the touch period TP ends and the actual display period DP starts, the gate driving circuit may output a pulse having the third voltage level V3 as a scan signal.

Similarly, a time point at which the gate driving circuit outputs the scan signal of the on-level gate voltage (e.g., high-level gate voltage VGH) for the display to the gate line may be a time point after the voltage level of the peripheral line 910 reaches from the fourth voltage level V4 to the third voltage level V3. Thus, the voltage level of the peripheral line 910 reaches the third voltage level V3 by at least the start of the next display period (e.g., DP2 in FIG. 10).

The time interval between the time when the voltage of the peripheral line 910 starts to increase from the fourth voltage level V4 and the time when the gate driving circuit outputs the scan signal of the on-level gate voltage for display may be less than the time interval between a time when the voltage level of the peripheral line 910 starts to increase from the fourth voltage level V4 and a time when the gate driving circuit starts to output the scan signal of the on-level gate voltage for the display again to any one of the plurality of gate lines.

Accordingly, at the start of the actual display period DP, since the voltage applied to the peripheral line 910 is saturated to the third voltage level V3, there may be solved the problem of deterioration in display quality.

Referring to FIGS. 8 and 10, the timing at which the touch power circuit TPIC outputs the high-level gate voltage VGH to the peripheral line 910 may be controlled by the second touch synchronization signal TsyncN2.

For example, the pseudo display period pDP may be a period in which the second touch synchronization signal TsyncN2 is at a high-level or a low-level.

For example, the pseudo display period pDP may include a period in which a signal of the second voltage level V2 is input to the one or more touch electrodes TE and the voltage level of the voltage applied to the peripheral line 910 increases from the fourth voltage level V4 to the third voltage level V3.

For example, the pseudo display period pDP may include a period in which a signal of the first voltage level V1 is input to the one or more touch electrodes TE and the voltage level of the voltage applied to the peripheral line 910 is the third voltage level V3.

For example, the pseudo display period pDP may include at least a portion of the touch period TP defined by the first touch synchronization signal TsyncN.

For convenience of explanation, it is assumed that the pseudo display period pDP is a period in which the second touch synchronization signal TsyncN2 is at a high-level. However, the pseudo display period pDP may also be defined by the method described above, and the pseudo display period pDP may be not limited to the definition by the waveform of the second touch synchronization signal TsyncN2.

The touch power circuit TPIC may output the high-level gate voltage VGH to the peripheral line 910 when the second touch synchronization signal TsyncN2 is at a high-level.

On the contrary, when the second touch synchronization signal TsyncN2 is at a low-level, the touch power circuit TPIC may output the high-level gate voltage VGH_M of which the pulse width is modulated to the peripheral line 910.

Meanwhile, the touch power circuit TPIC may generate and output the touch electrode driving signal TDS based on the first touch synchronization signal TsyncN. The touch power circuit TPIC may output the low-level gate voltage VGL_M whose pulse width is modulated based on the first touch synchronization signal TsyncN.

The timing at which the second touch synchronization signal TsyncN2 is switched from the high-level to the low-level may correspond to the timing at which the second touch synchronization signal TsyncN2 is switched from the display period DP to the touch period TP. That is, the timing at which the second touch synchronization signal TsyncN2 is switched from the high-level to the low-level may correspond to the timing when the first touch synchronization signal TsyncN is switched from the high-level to the low-level. Accordingly, the load-free driving may be performed by outputting the gate high-level voltage VGH_M of which the pulse width is modulated to the peripheral line 910.

Figure 11:
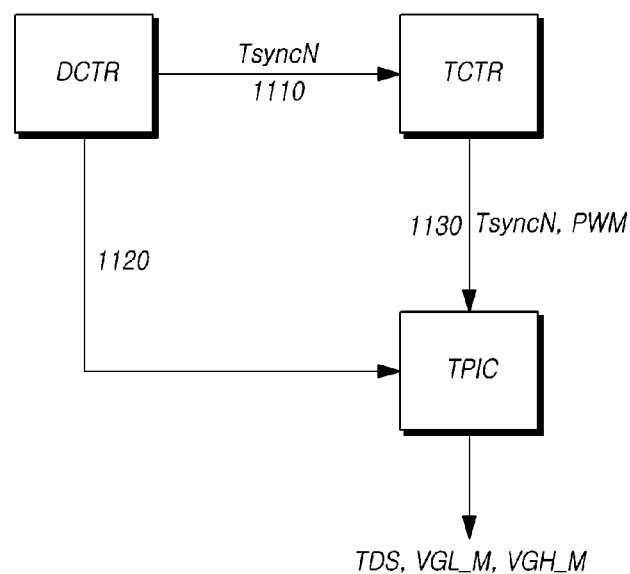
FIG. 11 illustrates a display controller, a touch controller, and a touch power circuit in a touch display device according to embodiments of the present disclosure.

FIG. 11 illustrates a display controller DCTR, a touch controller TCTR, and a touch power circuit TPIC in a touch display device according to embodiments of the present disclosure.

Referring to FIG. 11, a touch display device according to embodiments of the present disclosure may include a first path 1110 electrically connecting the display controller DCTR and the touch controller TCTR, a second path 1120 electrically connecting the display controller DCTR and the touch power circuit TPIC, and a third path 1130 electrically connecting the touch controller TCTR and the touch power circuit TPIC.

The first to third paths 1110 to 1130 may be implemented as cables, lines, or the like.

The first touch synchronization signal TsyncN may be transmitted from the display controller DCTR to the touch controller TCTR through the first path 1110. The touch controller TCTR may transmit the first touch synchronization signal TsyncN and the pulse width modulation (PWM) signal to the touch power circuit TPIC through the third path 1130.

The display controller DCTR may generate and output the second touch synchronization signal TsyncN2.

In the touch display device according to embodiments of the present disclosure, the display controller DCTR may generate the second touch synchronization signal TsyncN2, and transmit the generated second touch synchronization signal TsyncN2 to the touch controller (TCTR) through the first path 1110.

The touch controller TCTR may transmit the input second touch synchronization signal TsyncN2 to the touch power circuit TPIC through the third path 1130.

Accordingly, both the first touch synchronization signal TsyncN and the second touch synchronization signal TsyncN2 may be input to the touch power circuit TPIC.

In the touch display device according to other embodiments of the present disclosure, the display controller DCTR may generate the second touch synchronization signal TsyncN2, and transmit the generated second touch synchronization signal TsyncN2 to the touch power circuit TPIC through the second path 1120.

In the touch display device according to another embodiment of the present disclosure, the touch controller TCTR may generate the second touch synchronization signal TsyncN2, and transmit the generated second touch synchronization signal TsyncN2 to the touch power circuit TPIC through the third path 1130. For example, the touch controller TCTR may generate and output the second touch synchronization signal TsyncN2 based on the input first touch synchronization signal TsyncN.

A time interval between the starting time of the pseudo display period and the starting time of the actual display period may be preset or predetermined. In addition, the first touch synchronization signal TsyncN and the second touch synchronization signal TsyncN2 may be generated based on the time interval.

The touch power circuit TPIC may generate and output the touch driving signal TDS during the touch period based on the first touch synchronization signal TsyncN. The touch power circuit TPIC may generate and output the low-level gate voltage VGL_M whose pulse width is modulated during the touch period based on the first touch synchronization signal TsyncN. The touch power circuit TPIC may generate and output the high-level gate voltage VGH_M whose pulse width is modulated during the touch period based on the second touch synchronization signal TsyncN2.

Accordingly, the embodiments of the present disclosure may provide a touch display device with improved display quality in a touch display device in which a touch period and a display period are time-divided.

The above-described embodiments of the present disclosure may be briefly summarized as follows.

The embodiments of the present disclosure may provide a touch display device 100 including a display controller DCTR configured to generate and output a first touch synchronization signal TsyncN defining a display period DP and a touch period TP, and a control signal GCS, a gate driving circuit GDC configured to receive a high-level gate voltage VGH and the control signal GCS, and generate and output a gate voltage pulse Vgate based on the high-level gate voltage VGH and the control signal GCS, a display panel DISP in which a plurality of gate lines GL to which the gate voltage pulse Vgate is input and a plurality of sub-pixels SP electrically connected to the plurality of gate lines GL are disposed, a touch controller TCTR configured to receive the first touch synchronization signal TsyncN, and generate and output a pulse width modulation (PWM) signal, and a touch power circuit TPIC configured to output a voltage (e.g., VGH_M) generated based on the pulse width modulation signal to the gate driving circuit GDC in at least a partial period of the touch period TP, and output the high-level gate voltage VGH to the gate driving circuit GDC based on a second touch synchronization signal TsyncN2 defining a pseudo display period pDP in the remaining partial period of the touch period TP.

In the touch display device 100 according to the embodiments of the present disclosure, the pseudo display period pDP may overlap the remaining partial period of the touch period TP and the display period DP.

In the touch display device 100 according to the embodiments of the present disclosure, the display controller DCTR may generate and output the second touch synchronization signal TsyncN2 based on a preset time interval Δt2.

In the touch display device 100 according to the embodiments of the present disclosure, the display controller DCTR may transmit the second touch synchronization signal TsyncN2 through a first path 1110 electrically connecting the display controller DCTR and the touch controller TCTR.

In the touch display device 100 according to the embodiments of the present disclosure, the display controller DCTR may transmit the second touch synchronization signal TsyncN2 through a second path 1120 electrically connecting the display controller DCTR and the touch power circuit TPIC.

In the touch display device 100 according to the embodiments of the present disclosure, the touch controller TCTR may generate and output the second touch synchronization signal TsyncN2 based on a preset time interval Δt2.

In the touch display device 100 according to the embodiments of the present disclosure, the touch controller TCTR may generate the second touch synchronization signal TsyncN2 based on the first touch synchronization signal TsyncN.

In the touch display device 100 according to the embodiments of the present disclosure, the touch controller TCTR may transmit the second touch synchronization signal TsyncN2 through a third path 1130 electrically connecting the touch controller TCTR and the touch power circuit TPIC.

In the touch display device 100 according to the embodiments of the present disclosure, the touch power circuit TPIC may generate and output a touch electrode driving signal TDS based on the first touch synchronization signal TsyncN and the pulse width modulation signal, and the display panel DISP may include a plurality of touch electrodes TE to which the touch electrode driving signal TDS is input.

In the touch display device 100 according to the embodiments of the present disclosure, the display panel DISP may include a peripheral line 910 electrically connecting the touch power circuit TPIC and the gate driving circuit GDC and applying a voltage (e.g., VGH_M) generated based on the pulse width modulation signal.

In the touch display device 100 according to the embodiments of the present disclosure, a voltage level of the high-level gate voltage VGH may be a first voltage level (e.g., V3 in FIG. 10), and the voltage (e.g., VGH_M) generated based on the pulse width modulation signal may vary in a voltage level range lower than the first voltage level.

In the touch display device 100 according to the embodiments of the present disclosure, the lowest voltage level in the voltage level range may be a second voltage level (e.g., V4 in FIG. 10), wherein a length Δt1 of a period in which a voltage applied to the peripheral lines 910 reaches the first voltage level (e.g., V3 in FIG. 10) from the second voltage level (e.g., V4 in FIG. 10) may be less than or equal to a time interval Δt2 between a starting time of the display period DP and a starting time of the pseudo display period pDP.

In the touch display device 100 according to the embodiments of the present disclosure, a high-level or a low-level of the second touch synchronization signal TsyncN2 may define the pseudo display period pDP.

The embodiments of the present disclosure may provide a touch display device 100 including a display panel DISP including a substrate, a plurality of sub-pixels SP disposed on the substrate, a plurality of data lines DL and a plurality of gate lines GL electrically connected to the plurality of sub-pixels SP, and a plurality of touch electrodes TE overlapping at least one sub-pixel SP among the plurality of sub-pixels SP, a gate driving circuit GDC configured to receive a high-level gate voltage VGH through a peripheral line 910 disposed on the substrate and output a gate voltage pulse Vgate to the plurality of gate lines GL, a first circuit (e.g. touch controller TCTR, etc.) configured to output a pulse width modulation (PWM) signal, a second circuit (e.g. touch driving circuit TDC, etc.) configured to output a touch electrode driving signal TDS having the same frequency as the pulse width modulation signal to one or more of the plurality of touch electrodes TE, and a third circuit configured to output, in a period (e.g. touch period TP) in which the second circuit outputs the touch electrode driving signal TDS to at least one touch electrode TE among the plurality of touch electrodes, a signal having the same frequency as the pulse width modulation signal to the gate driving circuit GDC through the peripheral line 910, wherein, before a signal of a first voltage level (e.g., the first voltage level V1 in FIG. 10) for display is applied to the at least one touch electrode, a voltage applied to the peripheral line 910 may increase to a second voltage level higher than the first voltage level.

In the touch display device 100 according to the embodiments of the present disclosure, the first circuit and the second circuit are arranged in one integrated circuit.

In the touch display device 100 according to the embodiments of the present disclosure, the first circuit may include a touch controller TCTR, the second circuit may include a touch driving circuit TDC, and the third circuit may include a touch power circuit TPIC.

In the touch display device 100 according to the embodiments of the present disclosure, in a period in which the second circuit outputs the touch electrode driving signal TDS to at least one of the plurality of touch electrodes TE, a voltage applied to the peripheral line 910 may decrease to a third voltage level (e.g., the fourth voltage level V4 in FIG. 10) lower than the first voltage level.

In the touch display device 100 according to the embodiments of the present disclosure, a time point (e.g., a time point when the touch period ends and the display period starts) at which the gate driving circuit GDC resumes output of an on-level gate voltage pulse Vgate for display may be after the voltage applied to the peripheral line increases from the third voltage level to the second voltage level.

In the touch display device 100 according to the embodiments of the present disclosure, a period in which a voltage level of the peripheral line 910 increases from the second voltage level to the high-level gate voltage may be shorter than a time interval between a time point when the voltage level of the peripheral line 910 starts to increase from the third voltage level and a time point when the gate driving circuit GDC resumes outputting an on-level gate voltage pulse Vgate for display to any one of the plurality of gate lines GL.

In the touch display device 100 according to the embodiments of the present disclosure, the second voltage level may be the high-level gate voltage VGH level.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device comprising:
   a display controller configured to generate and output a first touch synchronization signal and a control signal, the first touch synchronization signal defining a display period and a touch period;
   a gate driving circuit configured to receive a high-level gate voltage and the control signal, and generate and output a gate voltage pulse according to the high-level gate voltage and the control signal;
   a display panel comprising a plurality of gate lines to which the gate voltage pulse is input and a plurality of sub-pixels that are electrically connected to the plurality of gate lines;
   a touch controller configured to receive the first touch synchronization signal, and generate and output a pulse width modulation signal; and
   a touch power circuit configured to output a voltage that is generated based on the pulse width modulation signal to the gate driving circuit in at least a first period of the touch period, and output the high-level gate voltage to the gate driving circuit based on a second touch synchronization signal that defines a pseudo display period in a second period of the touch period that is after the first period.

2. The touch display device of claim 1, wherein the second period is a remaining period of the touch period and the pseudo display period overlaps the remaining period of the touch period and the display period that is after the touch period.

3. The touch display device of claim 1, wherein the display controller generates and outputs the second touch synchronization signal based on a preset time interval.

4. The touch display device of claim 1, wherein the touch controller generates and outputs the second touch synchronization signal based on a preset time interval.

5. The touch display device of claim 4, wherein the touch controller generates the second touch synchronization signal based on the first touch synchronization signal.

6. The touch display device of claim 1, wherein the touch power circuit generates and outputs a touch electrode driving signal based on the first touch synchronization signal and the pulse width modulation signal,
   wherein the display panel comprises a plurality of touch electrodes to which the touch electrode driving signal is input during the touch period to sense touch of the plurality of touch electrodes.

7. The touch display device of claim 1, wherein the display panel comprises a peripheral line that electrically connects together the touch power circuit and the gate driving circuit, the peripheral line applied with a voltage that is generated based on the pulse width modulation signal.

8. The touch display device of claim 7, wherein a voltage level of the high-level gate voltage is a first voltage level, and the voltage generated based on the pulse width modulation signal varies in a voltage level range that is less than the first voltage level.

9. The touch display device of claim 8, wherein a lowest voltage level in the voltage level range is a second voltage level,
   wherein a length of a period during which the high-level gate voltage applied to the peripheral line rises from the second voltage level to the first voltage level is less than or equal to a time interval between a starting time of the display period and a starting time of the pseudo display period.

10. The touch display device of claim 1, wherein a high-level of the second touch synchronization signal defines the pseudo display period.

11. A touch display device comprising:
    a display panel comprising a substrate, a plurality of sub-pixels on the substrate, a plurality of data lines and a plurality of gate lines electrically connected to the plurality of sub-pixels, and a plurality of touch electrodes overlapping at least one sub-pixel among the plurality of sub-pixels;
    a gate driving circuit configured to receive a high-level gate voltage through a peripheral line disposed on the substrate, and output a gate voltage pulse to the plurality of gate lines according to the high-level gate voltage;
    a first circuit configured to output a pulse width modulation signal;
    a second circuit configured to output a touch electrode driving signal having a same frequency as the pulse width modulation signal to one or more of the plurality of touch electrodes; and
    a third circuit configured to output a signal having the same frequency as the pulse width modulation signal to the gate driving circuit through the peripheral line, the signal outputted during a period in which the second circuit outputs the touch electrode driving signal to at least one touch electrode among the plurality of touch electrodes;
    wherein a voltage applied to the peripheral line increases to a second voltage level that is greater than a first voltage level of a signal for display before the signal is applied to the at least one touch electrode during the display period.

12. The touch display device of claim 11, wherein the voltage applied to the peripheral line decreases from the second voltage to a third voltage level that is less than the first voltage level in a period in which the second circuit outputs the touch electrode driving signal to at least one of the plurality of touch electrodes.

13. The touch display device of claim 12, wherein a time point at which the gate driving circuit resumes output of an on-level gate voltage pulse for display during the display period is after the voltage applied to the peripheral line increases from the third voltage level to the second voltage level.

14. The touch display device of claim 12, wherein a period in which a voltage level of the peripheral line increases from the third voltage level to the high-level gate voltage is less than a time interval between a time point when the voltage level of the peripheral line starts to increase from the third voltage level and a time point when the gate driving circuit resumes outputting a gate voltage pulse for display to any one of the plurality of gate lines during the display period.

15. The touch display device of claim 11, wherein the second voltage level is the high-level gate voltage level.

16. A touch display device comprising:
a display panel comprising a substrate, a plurality of sub-pixels on the substrate, a plurality of data lines and a plurality of gate lines electrically connected to the plurality of sub-pixels, and a plurality of touch electrodes overlapping at least one sub-pixel among the plurality of sub-pixels;
a plurality of signal generating circuits configured to generate a high-level gate voltage, a first touch synchronization signal defining a touch period and a display period that is after the touch period, and a second touch synchronization signal defining a first period and a second period that is after the first period, the first period overlapping a first portion of the touch period and the second period overlapping the display period and a second portion of the touch period that is after the first portion of the touch period; and
a gate driving circuit configured to receive the high-level gate voltage through a peripheral line, and output a gate signal to the plurality of gate lines during the display period according to the high-level gate voltage,
wherein during the second period of the second touch synchronization signal that overlaps the second portion of the touch period, the high-level gate voltage applied to the peripheral line increases from a first voltage level to a second voltage level that is greater than the first voltage level and reaches the second voltage level by at least a start of the display period defined by the first touch synchronization signal.

17. The touch display device of claim 16, wherein the gate signal is output to the plurality of gate lines during the display period after the high-level gate voltage reaches the second voltage level during the second period of the second touch synchronization signal that overlaps the second portion of the touch period.

18. The touch display device of claim 17, wherein one of the plurality of signal generating circuits is further configured to output a common voltage that is applied to the plurality of touch electrodes during the display period to display an image,
wherein during the second period of the second touch synchronization signal that overlaps the display period, the high-level gate voltage having the second voltage level is applied to the peripheral line while the common voltage is applied to the plurality of touch electrodes during the display period.

19. The touch display device of claim 16, wherein a duration of a part of the second period of the second touch synchronization signal that overlaps the second portion of the touch period is a preset time interval.

20. The touch display device of claim 16, wherein one of the plurality of signal generating circuits is further configured to output a touch driving signal that is pulse width modulated, the touch driving signal applied to a touch electrode from the plurality of touch electrodes during the touch period to sense touch of the display panel,
wherein during the first period of the second touch synchronization signal a voltage is applied to the peripheral line having a phase and frequency that matches a phase and frequency of the touch driving signal that is concurrently being applied to the touch electrode during the touch period.

\* \* \* \* \*